(12) United States Patent
Hougham et al.

(10) Patent No.: US 7,613,368 B2
(45) Date of Patent: Nov. 3, 2009

(54) MIXED ELECTRICAL AND OPTICAL LGA INTERPOSER FOR FACILITATING CHIP TO BOARD COMMUNICATIONS BY DUAL SIGNAL TYPES

(75) Inventors: Gareth G. Hougham, Ossining, NY (US); Russell A. Budd, North Salem, NY (US); Punit P. Chiniwalla, New York, NY (US); Paul W. Coteus, Yorktown Heights, NY (US); Alphonso P. Lanzetta, Marlboro, NY (US); Frank R. Libsch, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 10/988,220

(22) Filed: Nov. 12, 2004

(65) Prior Publication Data

US 2006/0105607 A1    May 18, 2006

(51) Int. Cl.
*G02B 6/12*    (2006.01)
(52) U.S. Cl. .......................... 385/14; 439/65
(58) Field of Classification Search ............. 439/65, 439/66; 257/726; 385/39, 129, 131, 132; 438/28, 26; 372/43
See application file for complete search history.

(56) References Cited

U.S. PATENT DOCUMENTS

| | | | | |
|---|---|---|---|---|
| 4,070,516 | A * | 1/1978 | Kaiser | 428/137 |
| 6,525,407 | B1 * | 2/2003 | Drewery | 257/666 |
| 6,694,074 | B2 * | 2/2004 | Schunk | 385/33 |
| 6,819,813 | B2 * | 11/2004 | Howland et al. | 385/14 |
| 7,095,620 | B2 * | 8/2006 | Bozso et al. | 361/767 |
| 7,150,569 | B2 * | 12/2006 | Oono et al. | 385/88 |
| 2003/0103712 | A1 * | 6/2003 | Glebov et al. | 385/14 |
| 2005/0259174 | A1 * | 11/2005 | Nishio et al. | 348/340 |

* cited by examiner

*Primary Examiner*—Aexander Giman
(74) *Attorney, Agent, or Firm*—Daniel P. Morris; Anne Vachon Dougherty

(57) ABSTRACT

Integrated optoelectronic chips or collections of chips on a module that have both electrical as well as optical interconnects offer many advantages in speed, power consumption and heat generation. Mixed signal types, however, pose significant packaging challenges. This invention describes a land grid array (LGA) interposer which can simultaneously connect electrical and optical signals from a module to a printed circuit board.

16 Claims, 14 Drawing Sheets

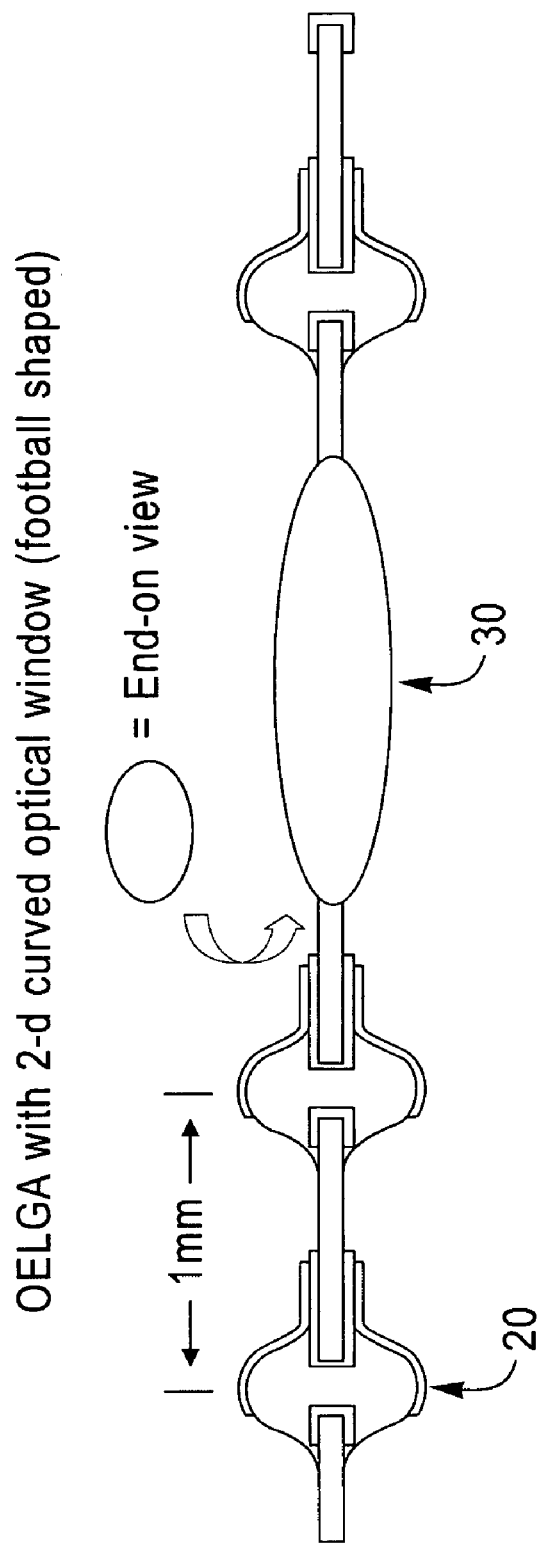

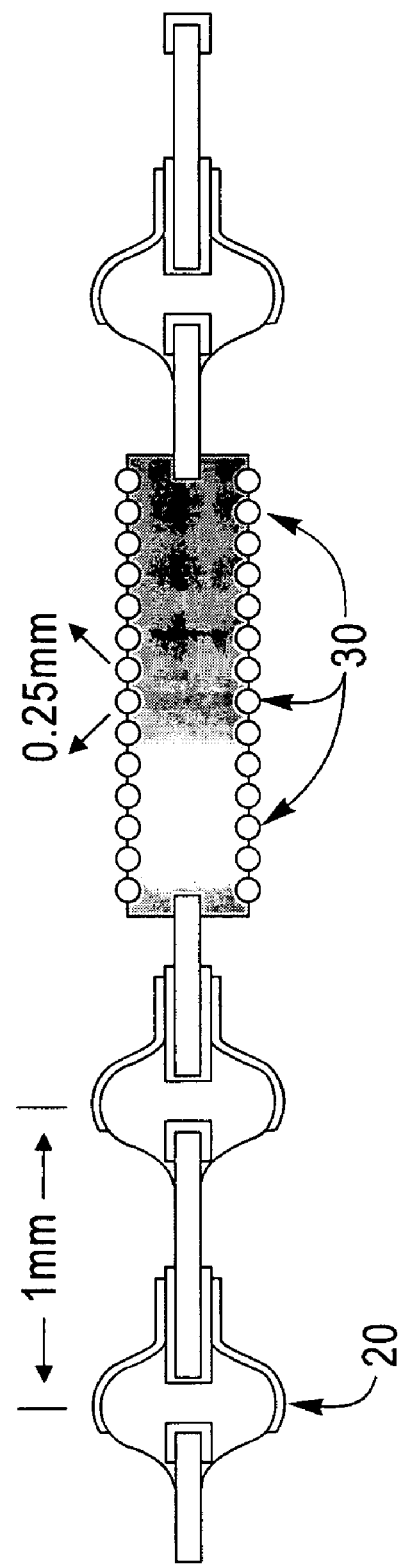

Figure 1A:
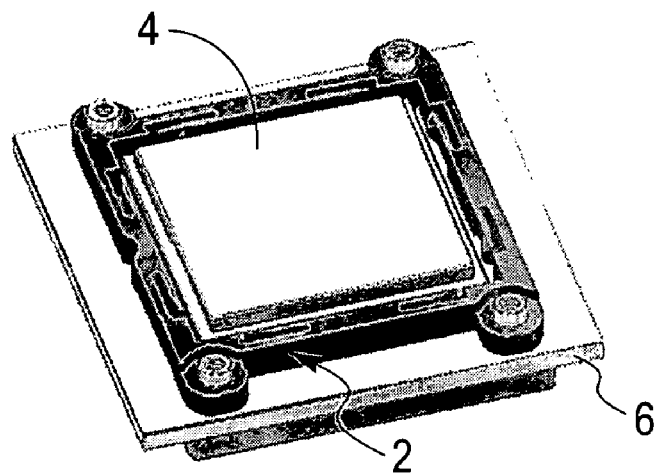

MIXED ELECTRICAL AND OPTICAL LGA INTERPOSER FOR FACILITATING CHIP TO BOARD COMMUNICATIONS BY DUAL SIGNAL TYPES

BACKGROUND

Integrated optoelectronic chips or collections of chips on a module that have both electrical as well as optical interconnects offer many advantages in speed, power consumption and heat generation. Mixed signal types, however, pose significant packaging challenges. This invention describes a land grid array (LGA) interposer which can simultaneously connect electrical and optical signals from a module to a printed circuit board.

In a mixed optical electrical LGA interposer (OELGA) there are a plurality of electrical contacts which are constructed to have conducting elements extend in both directions perpendicular to the plane of the interposer with the purpose of connecting a BLM from a module above to the TLM of a PWB below. These conducting elements or contacts (aka buttons) can be composed of a variety of materials and geometries but always have both conducting and mechanical compliance (spring) functions. There are also one or more optical interconnects (windows) which have the dual functions of optical transparency and mechanical compliance. These compliant optical windows can be conveniently fabricated from silicone rubber injection molded directly into place in the desired form.

The proper combination of electrically conductive buttons and optical windows allow a chip module that has both electrical and optical chips to communicate through the LGA onto the circuit board.

An alternative to such spring-loaded windows might be simple openings in the LGA which would allow the optical signals to pass. However, the omission of a compliant window would allow introduction of dust which could block the optical path and lead to reliability concerns. Thus, the preferred embodiment of this patent utilizes such a compliant window to create a dust free, uninterrupted optical path.

There are a great variety of conceivable arrangements that would apply to different ratios of electrical to optical signals, to different laser and detector choices, different pitch, pin count, and so forth as would be obvious to those skilled in related arts.

DESCRIPTION OF THE PREFERRED EMBODIMENT

An electronic package consisting of a chip or a plurality of chips mounted to a chip-carrier such as a multichip ceramic, glass ceramic or organic module and which also has embedded in this module arrays of vertical cavity Semiconductor Cavity Laser (VCSCL) and photodetectors (PD), is connected via the application of pressure from appropriate hardware to a printed wiring board via a land grid array interposer which can accommodate both electrical and optical signals. Some lens assemblies may also be required. In addition to the electrical signals which are passed from BLM to the LGA contacts and through to the PWB, as in an ordinary electrical LGA, optical signals are passed from the VCSCL and PD array in the module, through the optical window in the LGA to the corresponding VCSCL and PDs on the PWB.

Figure 1B:
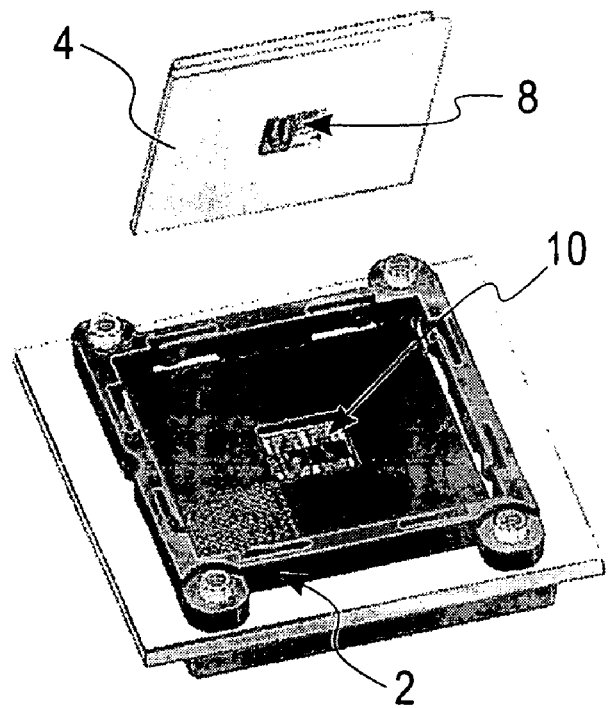
Figure 2A:
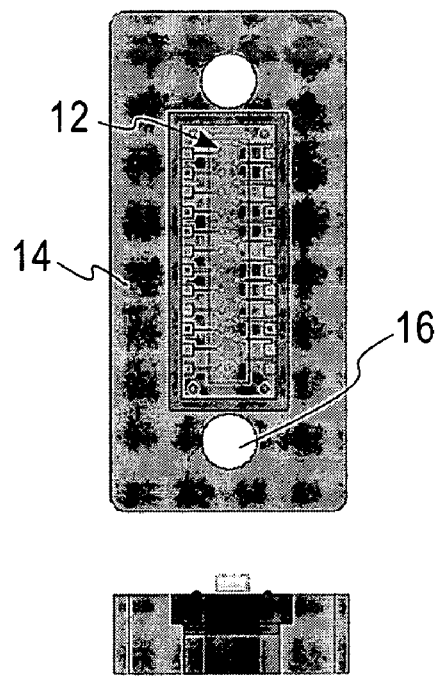
Figure 2B:
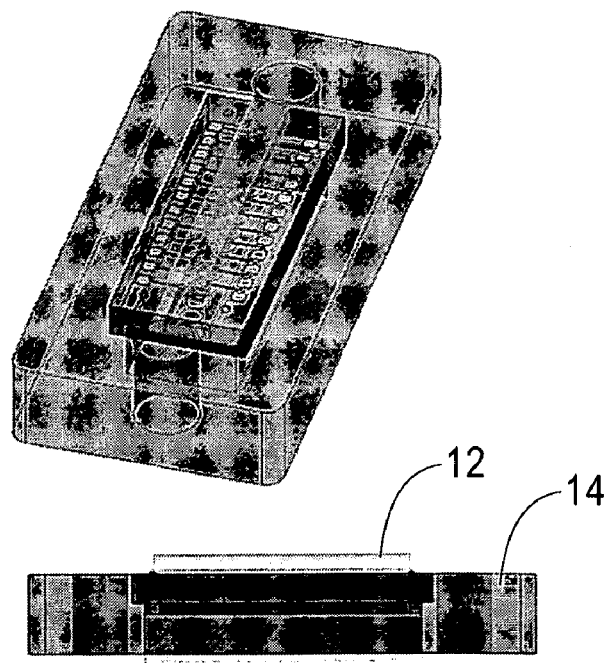
Figure 3:
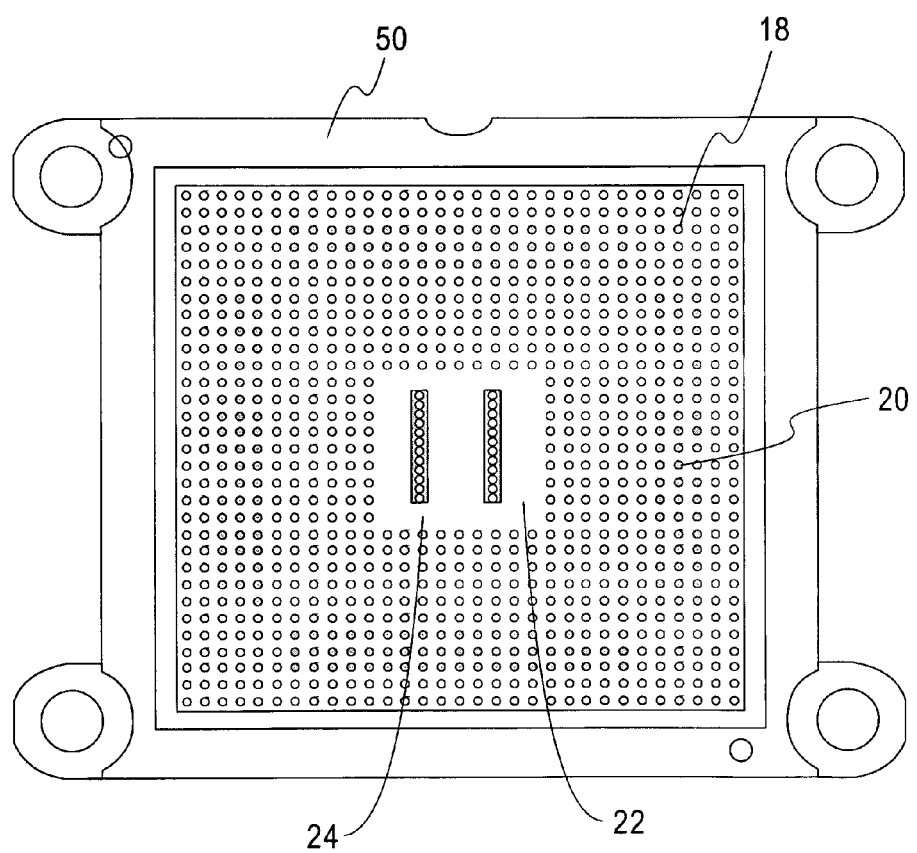

FIG. 1 illustrates an example of such an arrangement but does not show the details of the optical window 10, for which there are many possible designs. FIG. 2 illustrates the one example of a VCSCL/PD array 12 that could be imbedded in the module 14 and PWB and that would communicate through the compliant optical windows of this invention. FIG. 3 shows one arrangement of optical and electrical I/Os in an LGA 50. Electrical contacts are represented by small round circles, and could consist of many different types of LGA contacts such as the Cinch random coil spring by Synapse, the cantilever type by Tyco, or a C-spring type by Interconn, among others. Either all sites in the regular array can be populated with contacts or these sites can be only partly populated as the I/O density of the application requires. In the illustration, the open circles 18 represent unpopulated grid points and the close circles 20 represent those sites populated with electrical I/O contacts.

Figure 4:
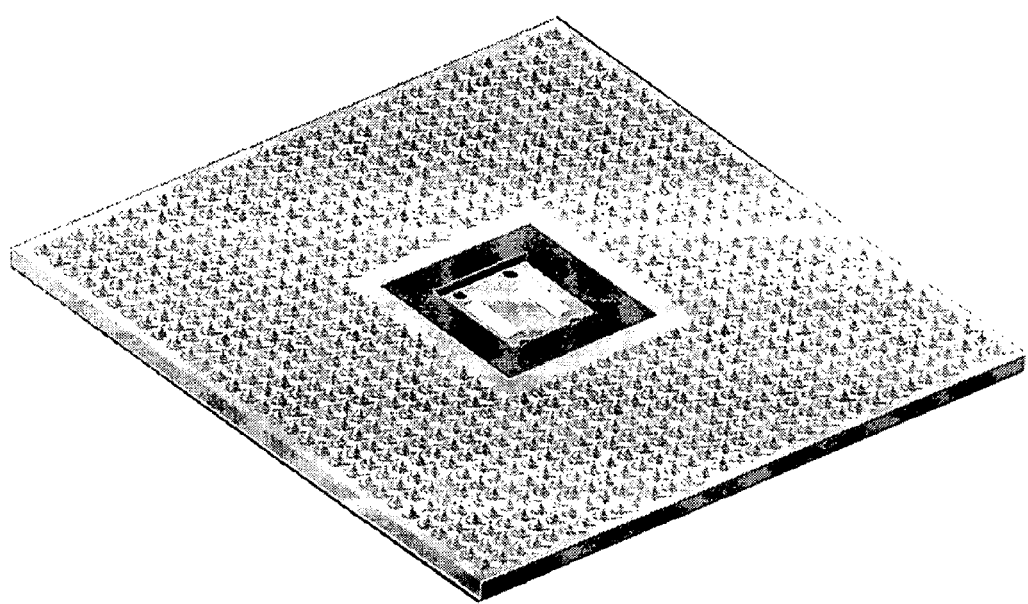

The area intended for optical connection is the roughly square area 22 devoid of such electrical contacts in the center of the LGA in the figure. In the preferred embodiment, this area will be occupied by optically transparent, compliant material such as silicone rubber (polydimethylsiloxane or PDMS). (For reference, two VCSCL and PD linear arrays 24 embedded in the module are shown in this square). FIG. 4 illustrates an example of an LGA with such compliant windows. In this example the PDMS window is a single fabricated piece that has two areas raised in positive relief on both sides of the window plane. While shown in orange for the plane section and white for the positive relief, they are meant to represent a single monolithic molded piece of optically transparent PDMS. Though, it could also be fabricated from a carrier plane with two rectangular windows in which case the orange might be a non-transparent material and where only the white rectangles would be transparent. Around the edge shown in blue is a frame that is intended to hold the window material taught across the opening in the LGA. Also shown are alignment holes which accommodate alignment pins that will extend from a fixed position on either the VCSCL/PD in the module or PWB, go through the alignment holes in the LGA, and into alignment holes in the corresponding VCSCL and PD arrays. This is necessary because very precise xy alignment is necessary for good optical signal transmission. The alignment of the electrical IO on the LGA requires less xy precision and so the orientation of the entire LGA can be accomplished by these pins and through holes.

Figure 5:
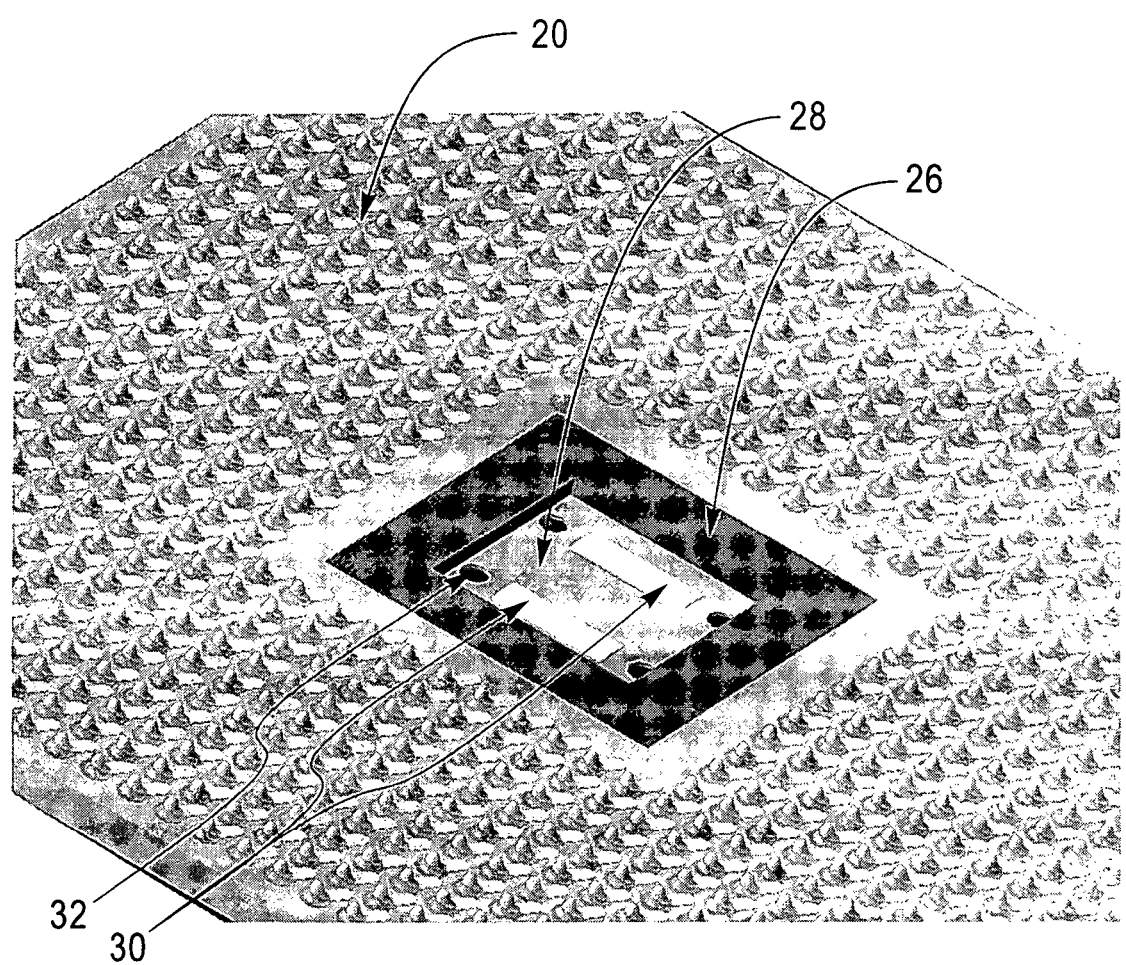
Figure 6:
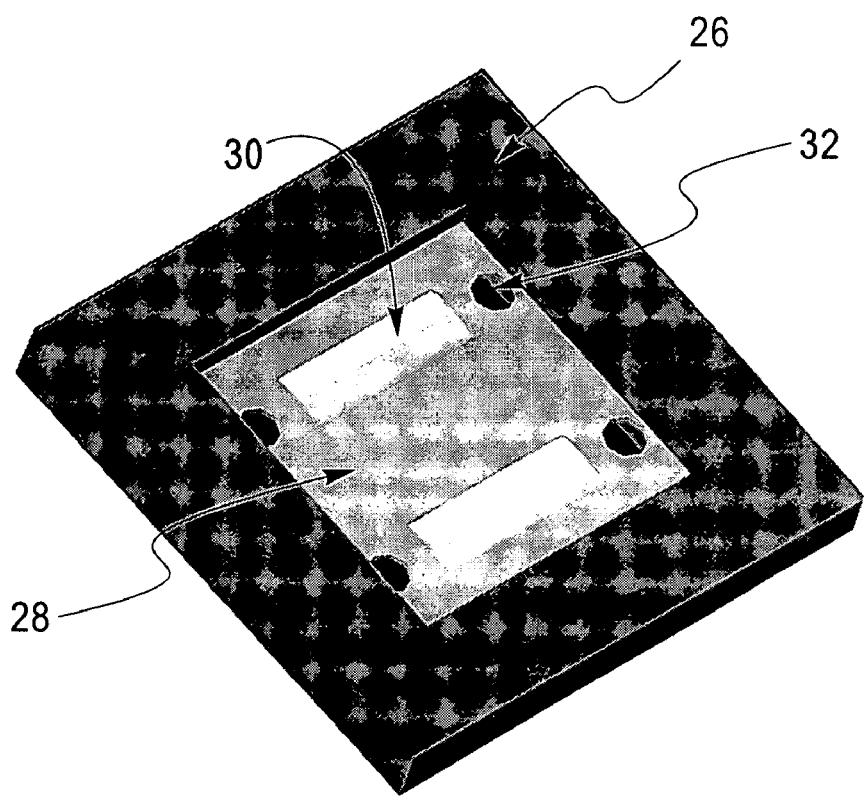
Figure 7:
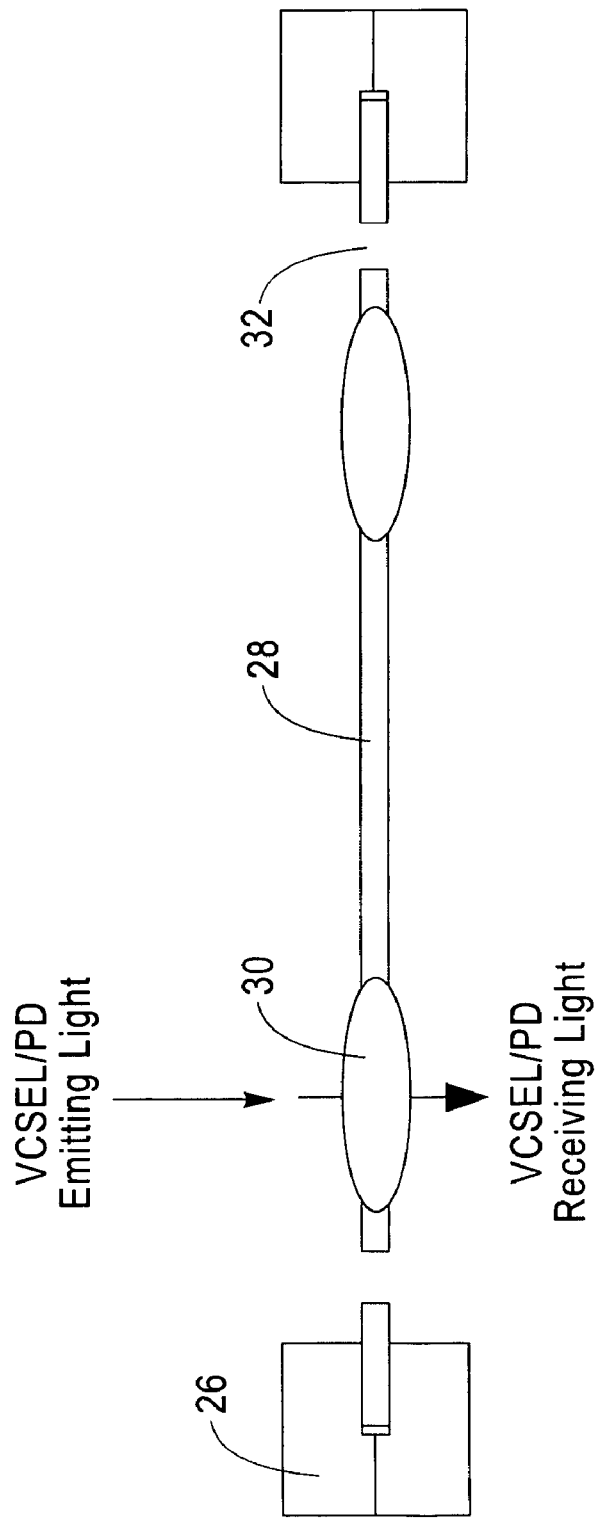
Figure 8:
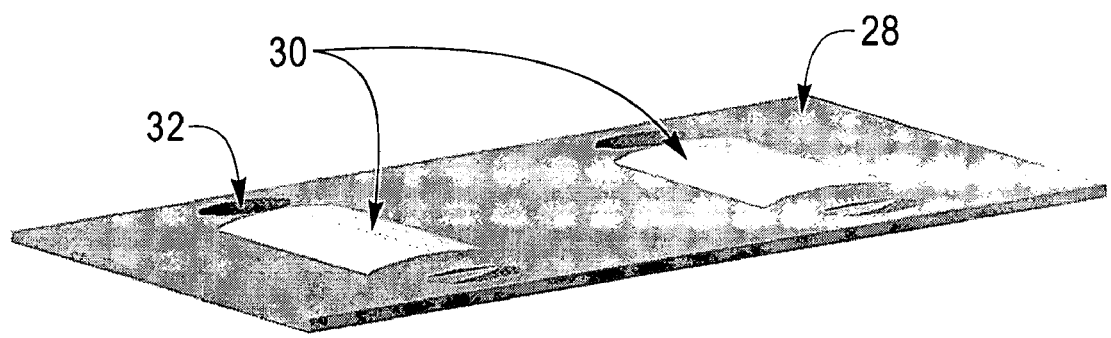

FIG. 5 shows this more blown up. FIG. 6 shows the optical window portion of the mixed optical/electrical LGA and its associated frame. FIG. 7 shows a profile view of the optical window portion alone, without the frame. In this view you can see that the two rectilinear sections of positive relief are in both vertical directions. This is so that when the chip module, the LGA, and the PWB are sandwiched together, the VCSCL and PD arrays will touch a curved surface of the compliant window on both sides first. As the sandwich is squeezed together under ever greater pressure, the optical contact against the compliant window is made intimate and excludes any bubbles that might otherwise form. FIG. 8 shows an isometric view of this window.

Two Major Cases in Mixed Optical/Electrical LGAs

Cases:

1) Free Space Transmission of Optical Signals with a Compliant Gasket Protecting Area from Dust Infiltration.
   1.1) Single button area with dust collar
   1.2) An area enclosing a plurality of optical paths through free space. Collectively protected from dust by a compliant gasket.

2) Compliant Optical Windows
   2.1) Buttons as single windows. An LGA connector with a 2-dimentional array of electrical buttons could have certain button positions vacated and optical window put in their place. It is unlikely that individual VCSEL elements would be arranged on the same pitch as the buttons, (because they are usually on a tighter pitch like 250 um) but this hypothetical case provides a useful design reference point.

2.2) Optical windows accommodating a greater area or a different area than a single LGA button gridpoint. And example would be a rectilinear geometry to accommodate a linear array of VCSELs, as shown in FIGS. 1-8. This is one of the preferred embodiments. It consists of a compliant LGA window that would fit over a linear array of VCSELs. It would have a width generous enough to cover one VCSEL light source and long enough to cover the full linear array. A common VCSEL array consists of 12 light sources on 250 micron pitch. Thus, an appropriate window might be 500 um wide by 4 mm long which provides a margin of extra material on each outside edge to ensure good contact.

2.3) Multiple windows for different optical arrays. One could have more than one such window to accommodate more than one VCSEL array. Two VCSEL arrays placed side by side could utilize two windows fabricated in the LGA plane side by side. As shown in the accompanying diagram labeled FIG. 1. Or, two side by side linear arrays could utilize one single window wide enough for both.

2.4) Windows to cover two dimensional array of optical elements (as opposed to the linear array of the previous example and as shown in figures).

2.5) Window Geometries, xy dimensions. The geometry of the window could vary in the xy plane as necessary to cover as many optical connections as necessary or convenient. It could accommodate a single optical IO path, or many. And a given LGA could have a plurality of such windows placed in optimal locations.

2.6) Window Geometries, z Dimensions.

Further, window geometry can have many different three dimensional shapes for different applications. This includes variation in the x, the y, and the z thickness independent of each other. And, the x, y, and z dimensions may vary in different parts of the same window as may be desirable.

Figure 9:
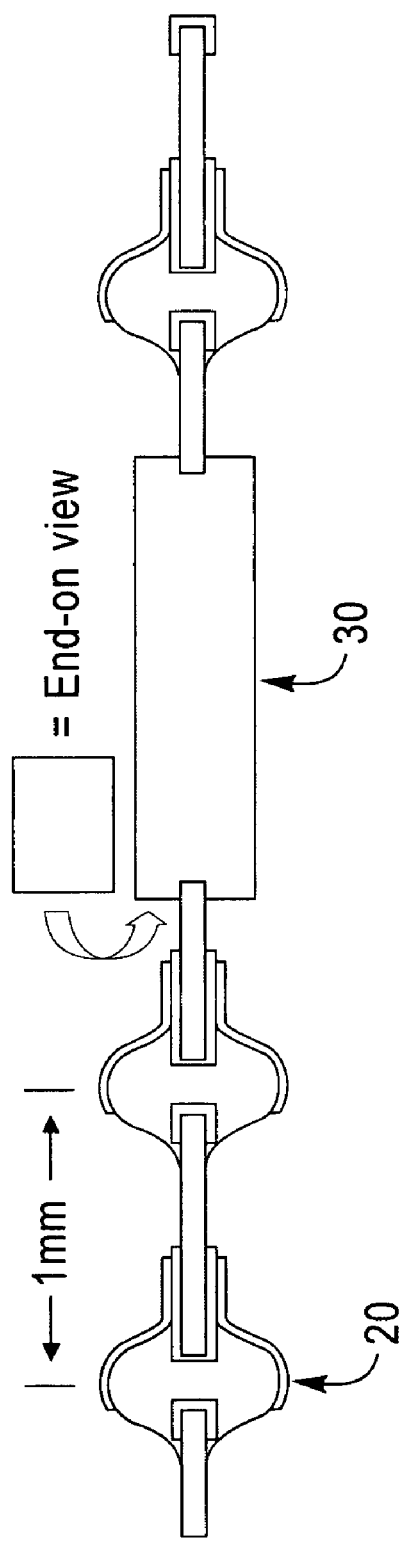
Figure 10:
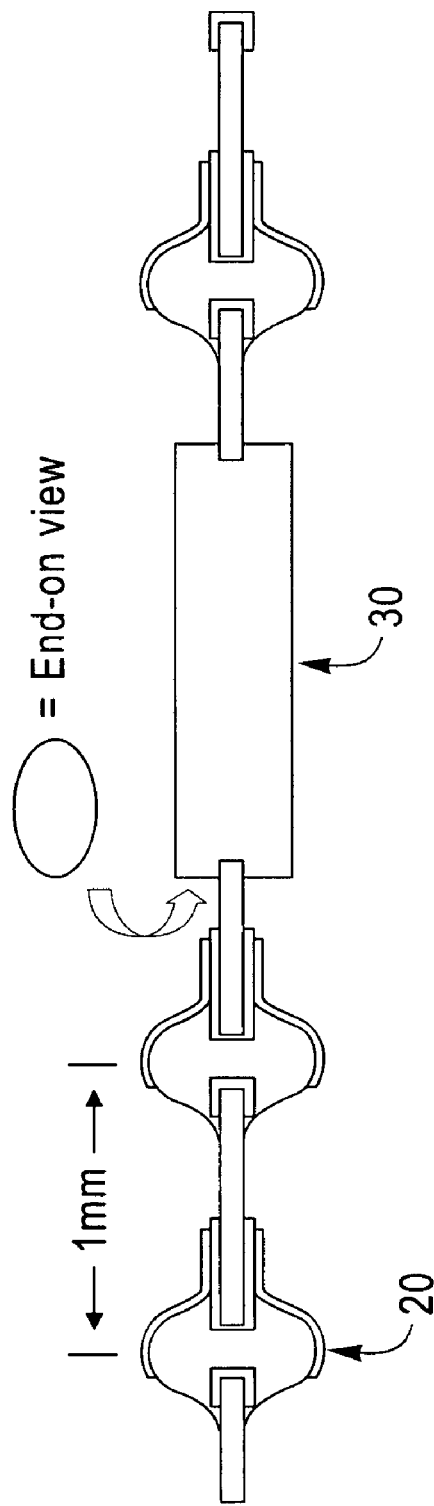
Figure 13A:
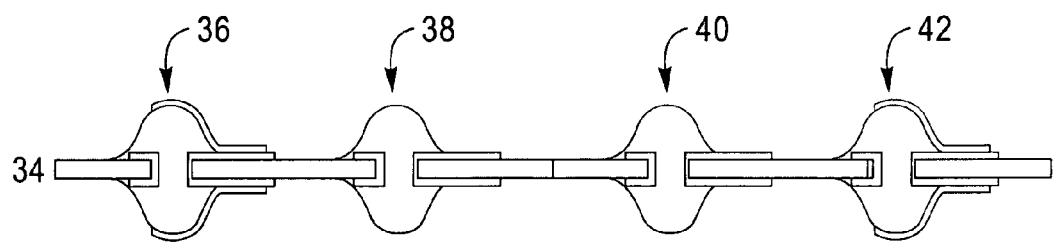
Figure 13B:
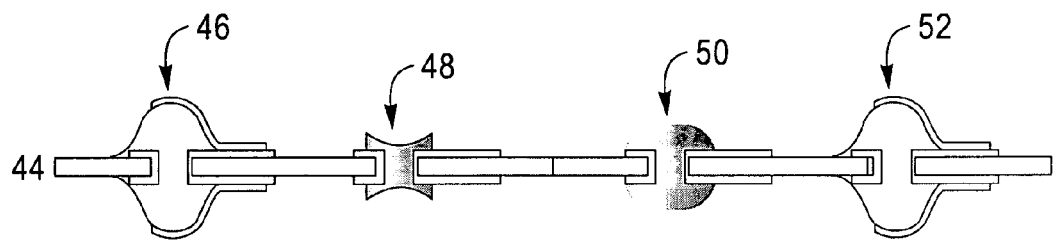
Figure 13C:
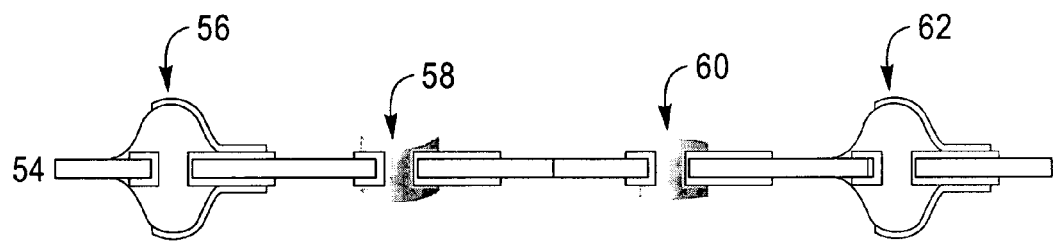

If the x, y, and z dimensions of a window were kept constant, as illustrated in FIG. 9, fabrication is simple. However, a window with curvature on the top and bottom surfaces would help eliminate air entrapment during LGA mating. It is possible that curvature in 1 dimension only (as illustrated in FIG. 10 would prevent such bubble entrapment, but curvature in the second dimension (a football shape as shown in FIG. 11) is an option that could be employed to ensure that.

2.7) Another option is to have a surface topology with features that correspond to the pitch of the optical elements themselves. Such as small bumps superimposed on the top and bottom surfaces of the large window such that each VCSEL and each PD would contact an small bump and thus insure elimination of bubbles. The downside to this option is the need for careful alignment. This should be included for completeness only as the global curvature options of 3a-3c are considered preferable.

2.8) In addition or instead of compliant optical window, light shaping or lens functions could be built into the LGA. This could be done in a number of ways including.

2.81) Static positioned lenses could be firmly affixed in various positions in the LGA. Examples of isolated lenses are shown in FIG. 11 where various combinations of compliant electrical contacts (eg Aa), transparent compliant windows with no intended lensing function (eg. Ab), dual sided concave lens (eg. Bb), dual sided convex lens (eg. Bc), mixed concave convex lens (eg. Cb), or fresnel lens (eg Cc) can be located together on an LGA as may be optimal for a specific application.

2.82) Another method for including lenses would embed a lens with the desired shape and refractive index properties in a compliant transparent window. These can either be fixed in place relative to the carrier plane or can be made floating in the compliant optical window material as shown in FIGS. 13*b* and 13*c*, 13*a* and 13*d* are intended to represent compliant electrical contacts. Such floating lenses could have the benefit of self adjusting the direction of the lens as various mechanical stresses are applied to the LGA in the course of operation such as stresses induced by coefficient of thermal expansion mismatches as temperatures shift.

Self Alignment Capabilities

There are a number of ways that this technology can self align, which is an important feature in some applications.

1) As is already implied, the use of compliant (rubbery) materials as the optical window allows the optical elements (VCSEL/PD) to make intimate contact on both sides of the LGA. The amount of pressure applied to the LGA via actuation hardware will determine how far beyond point contact the optical elements travel farther toward each other.

2) Another way that this technology allows alignment is by facilitating xy movement of the compliant window independent of the rest of the LGA by the intrinsic elastomeric qualities of the window material. This can be tailored to allow significant amount of movement or very little to none relative to the rest of the LGA, as desired.

3) Another way this technology allows alignment is by allowing a lens embedded in an elastomeric window material to move in response to applied stresses. This can with proper design help the lens to steer the light from one optical element to another.

Fabrication of Optical Windows in LGA

Such optical windows in LGAs could be fabricated in a variety of ways and from a variety of materials.

Materials for CASE 1:

Where the function of the compliant material is as a dust gasket, leaving a freespace optical path, then the material does not need to be optically transparent. Only compliant. In this case many elastomer types such as PDMS, epoxy, polyurethane, acrylates, polyimides, etc may be used.

Materials for CASE 2:

Optical windows must be fabricated from compliant elastomer materials that are simultaneously transparent or significantly transparent to the wavelength of light utilized by the signaling semiconductor laser (VCSEL) and the photo detector (PD).

Polydimethyl siloxane (PDMS) which is also known as silicone rubber, in certain chemical formulations of same, has a transparency in the optical and near infrared where such optical signaling is most often carried out. Other materials could also be used such as epoxies, polyurethanes, acrylates, esters, polyimides, and the like.

Fabrication Methods:

There are at least two methods for making such compliant optical windows for the OELGA by injection or transfer molding.

1) Injection molding of PDMS windows onto or into the LGA carrier plane as an integral part of the LGA.

2) Injection molding the PDMS windows into a frame, which would subsequently be fitted to the LGA carrier plane. This is shown in FIGS. 1-6.

3) Another method would be to form the windows by application of a liquid onto a flat optically transparent support structure and allowing surface tension to form the desired curvature.

4) Another method would be to laminate an optically transparent material as the compliant window.

5) Another method would be to dip or otherwise coat the substrate, before the electrical contacts had been formed, into a precursor solution of PDMS. The liquid would form a uniform film over the openings in the manner commonly seen in soap films across a child's toy bubble ring. The PDMS, or other material, would cure in place. This could be performed twice to accomplish slight positive relief. First dip to form the film, and then suspending the LGA carrier plane horizontally, allow the PDMS to cure. Gravity would pull the film slightly downward and it would have this shape permanently upon curing. Then, a second dip could be carried out, or otherwise coated, and the LGA could be suspended horizontally again, but this time with the original top side facing down. Again, a slight curvature would follow the gravitational pull. Upon curing, this would be permanent.

6) One skilled in the art of forming polymer films could easily find many other obvious ways to form films as windows.

DESCRIPTION OF THE INVENTION

FIG. 1: An optoelectronic package consisting of chip module 4 with both electrical and optical communication outputs 8 a printed wiring board 6 (circuit board) a mixed electrical/optical LGA 2 sandwiched between them and providing electrical and optical connectivity at 10 between the two. Package is shown assembled and partly unassembled.

FIG. 2: Arrays 12 of VCSEL (vertical cavity semi conducting emitting laser)/PD (photodiode or photo detector). Embedding self contained optical I/O of this type into module and PWB is one example of how to integrate electronic and optical IO into the same package. In such an application, an LGA (land grid array interposer) is an efficient method to provide connection between both the electrical and optical functions on the module to the electrical and optical functions on the PWB.

FIG. 3: LGA interposer 50 showing outside frame, grid of electrical contacts 18 and 20 (some left untilled and some populated to demonstrate this design flexibility), a window 22 in the center allowing optical signals to pass. It also shows two linear arrays 24 of optical IO in this window for reference. These would be physically located in the module or PWB but would be visible through the window.

FIG. 4: Isometric view of LGA interposer with grid of electrical contacts and compliant window section in the center to allow optical signals to pass. Also visible is a frame structure 26 around the outside edge of the window 28 which can hold the window material 30 in place in the LGA carrier plane. Also shown are alignment holes 32 (16 of FIG. 2) which would be used to accommodate alignment pins. Since precise alignment is required between the VCSEL and the PD, alignment pins could be rigidly attached to the VCSEL/PD array on the module side (for instance), would then pass through the alignment holes in the LGA compliant window structure, and be inserted into alignment holes in the VCSEL/PD on the PWB.

FIG. 5: Blown up view of FIG. 4 with contacts 20, frame structure 26, window 28, window material 30 and alignment holes 32.

FIG. 6: Blown up view of the window structure section of the mixed electrical optical LGA. Shown are parts: A) Window structure frame 28. This can hold the window and, if present the window carrier sheet, in place in the main LGA carrier frame. It might be constructed of a top frame and a bottom frame that would sandwich the edge of the window carrier sheet (see D). B) alignment holes 32 to accommodate alignment pins extending from the VCSEL/PD on the module to the VCSEL/PD on the PWB. (or visa versa). C) Compliant optical window 30 in positive relief on both sides (facing both up and down relative to the plane). D) window carrier sheet. This can be either an integral part of C being made of the same material as C or could be a separate material with structural rather than optical properties. And example might be kapton film.

FIG. 7: Cross section of window sub structure of LGA. It shows frame A 26 clamping down on the window carrier sheet D 28 to hold it in place. It shows window B 30 and illustrates light passing through it from one VCSEL/PD device to the corresponding device on the other side of the LGA. Bearing in mind that when a full package is assembled as in FIG. 1, the compliant windows would be making intimate physical contact with the VCSEL/PD above and below the LGA.

FIG. 8: Isometric view of the window carrier 28 plane and window 30. These could be either separate materials with the carrier plane having properties optimized for structure and the window being optimized for compliance and transparency or they could be made from a single material that would be transparent, compliant, and supporting.

FIG. 9: Illustrates the profile of a mixed electrical/optical LGA where individual electrical LGA contacts 20 and a compliant optical window 30 that could accommodate either single or a multitude of VCSEL/PD devices. This drawing illustrates that the window could be fabricated right on the LGA carrier plane with no intervening window frame structure. And it portrays the window as having a right angle, flat rectilinear geometry.

FIG. 10: Similar to FIG. 9 except illustrates that the window 30 could have a curved top and bottom surface in one dimension but right-angular in the other dimension.

FIG. 11: Similar to FIGS. 9 and 10 except illustrates that the window 30 could have curvature in both dimensions (somewhat football shaped).

FIG. 12: Illustrates that rather than having a large window 30 with smooth but globally curved surface to accommodate a multitude of optical elements, it could have localized curves to mate with individual optical elements. This would require excellent alignment however and so is anticipated to be less important than the global window types shown in the other figures.

FIG. 13: Illustrates various combinations of single-grid-point electrical and optical connections. In assembly A, the gridpoint "Aa" is occupied by an electrical contact which makes electrical connection from the very top to the very bottom. In gridpoint "Ab" a compliant window 38, 40 is shaped to be the same size as the electrical contact 36, 42. In assembly B, gridpoint "Ba" is again an electrical contact 46, 52. Gridpoint "Bb" is a lens 48 embedded in the LGA carrier which has a concave shape on both sides. In gridpoint "Bc" is a lens 50 convex on both sides. In assembly C, gridpoint "Ca" is an electrical contact 56, 62. Gridpoint "Cb is a lens 58 with one convex and one concave sides. Gridpoint "Cc" is a Fresnel lens 60. In general, this figure is intended to show that many possible combinations of electrical, window (passive optical), and lens (functional optical) features can coexist to offer significant design advantage.

Figure 14:
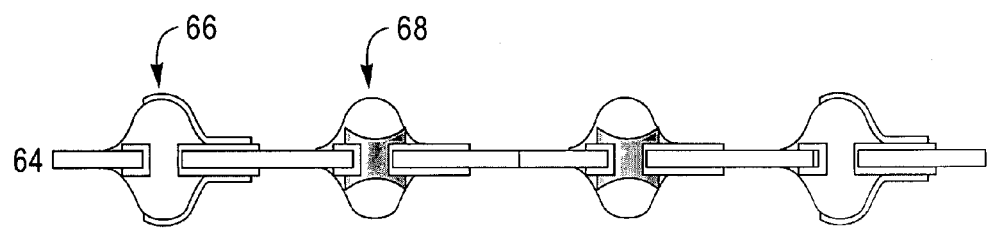

FIG. 14: Illustrates a combination of electrical and optical contacts. In assembly D, the gridpoint "Da" is by way of example, an electrical contact 66. Gridpoint "Db" shows an optical contact that has a lens 68 embedded in compliant optical material such as PDMS. This allows the VCSEL/PD devices to make intimate contact with the top and bottom surfaces, which would not be possible with a hard lens alone and eliminates air gaps. It also may provide a way for the lens to move slightly in response to mechanical stresses caused by shifting of one VCSEL/PD relative to the corresponding one on the other side of the LGA.

The invention claimed is:

1. An interposer device comprising: electrical and optical connecting components for providing electrical and optical interconnection between a first component containing both electrical and optical I/O to a second component with both electrical and optical I/O, wherein said interposer comprises a carrier plane having a plurality of electrical contacts and at least one opening to allow light transmission through free space.

2. An interposer of claim 1 wherein said opening is large enough to accommodate a plurality of optical I/O.

3. An interposer of claim 1 further comprising a compliant material surrounding the periphery of the opening such that when the interposer is brought into contact with a first component above and a second component below said compliant material is disposed against said first and second components to prevent particulates from entering said opening.

4. An interposer device comprising: a plurality of electrical contacts and at least one compliant optical window for providing electrical and optical interconnection between a first component containing both electrical and optical I/O to a second component with both electrical and optical I/O further including a compliant material surrounding the periphery of the window both above and below the interposer such that when the interposer is brought into contact with a first component above and a second component below said compliant material is disposed against said first and second components.

5. An interposer device of claim 4 wherein said window has at least one lens embedded in it.

6. An interposer of claim 4 wherein said optical window is fabricated of polymeric material that is adequately transparent to light of the desired communication wavelength.

7. An interposer of claim 6 wherein said at least one polymeric material comprises a material selected from the group consisting of polydimethyl siloxane, epoxy, polycarbonate, polyimide, polybutadiene, inorganic materials, silica glass, quartz and materials with a small value of elastic modulus.

8. An interposer according to claim 4 wherein said window is attached to a supporting structure which is then attached to an LGA carrier plane.

9. An interposer comprising: electrical and optical connecting components for providing electrical and optical interconnection between a first component containing both electrical and optical I/O to a second component with both electrical and optical I/O wherein said optical connection component comprises a window large enough to accommodate a plurality of optical I/O.

10. An interposer of claim 9 comprising a window that is substantially flat on the top and bottom.

11. An interposer of claim 9 comprising a window comprising a curvature in at least one dimension in order to eliminate bubbles.

12. An interposer of claim 9 where the window structure and or a window supporting structure has guide holes to allow an alignment pin from one optical element array to connect in alignment to a corresponding optical element array on the other component.

13. An interposer comprising: a plurality of electrical contacts and at least one compliant optical window for providing electrical and optical interconnection between a first component containing both electrical and optical I/O to a second component with both electrical and optical I/O wherein said at least one compliant window has curvature in at least one dimension.

14. An interposer of claim 13 wherein said window has one or more lens structures embedded in it.

15. An interposer comprising a plurality of electrical connecting components and a plurality of optical connecting components for connecting a first component containing electrical and optical I/O with a second component having both electrical and optical I/O, wherein said plurality of optical connecting components comprise at least two of the following: an opening having a compliant seal about the periphery of the opening, a compliant window material having curvature, a compliant window material having at least one embedded lens, a window material having a compliant seal and a lens.

16. An interposer of claim 15 further comprising at least one alignment hole in said interposer to facilitate alignment of said plurality of optical components with optical elements on said first and second components.

* * * * *